UNITED STATES PATENT OFFICE 2,592,565

ANIMAL FEED

Mortimer T. Harvey, South Orange, N. J., assignor to Harvel Research Corporation, a corporation of New Jersey No Drawing. Application February 15, 1951, Serial No. 213,479

4 Claims. (Cl. 99—2)

This invention relates to novel products and to methods for producing them. In one of its more specific aspects this invention is directed to animal feeds including reaction products of urea and either acetone, diacetone alcohol or mesityl oxide taken alone or in combination.

These reaction products are tri-acetone di urea, mono mesityl oxide mono urea and mono diacetone alcohol mono urea. The first may be produced by reacting urea and acetone in the molecular proportion of 3 to 2 and the other two compounds may be produced by reacting equimolecular proportions of urea and diacetone alcohol or mesityl oxide. When urea is reacted with diacetone alcohol or mesityl oxide there are produced compounds which appear to be isomers of each other.

In general, the reaction may take place in the presence of an acidic agent or catalyst which may be a mineral acid, examples of which are hydrochloric acid and sulfuric acid. In one of its specific aspects the urea may react with acetone, diacetone alcohol or mesityl oxide while slowly adding with constant stirring to said mixture an acidic agent such as dry hydrochloric acid. The reaction during the hydrochloric addition is exothermic and the temperature of the reacting mass is preferably maintained over the most part between 25° C.–50° C. and preferably between about 35° C.–40° C. by external cooling and by controlling the rate of supplying the hydrochloric acid to the mass. The quantity of dry hydrochloric acid added during the reaction may vary. For example, in a mass of 60 grams of urea and 135 grams of diacetone alcohol, mesityl oxide or acetone between 10–100 of dry hydrochloric acid may be used. After the last increment of dry hydrochloric acid has been added and the reacting mass has been maintained substantially continuously at 25–50° C. and preferably between 35–40° C. to reduce or completely obviate resinous formation which takes place at higher temperatures and to obtain high yields of the desired compound, the mass after substantial completion of the exothermic reaction may be poured into an equal volume of cold water and allowed to stand for cooling whereupon crystallization occurs. Instead of pouring the reaction mass at that stage into cold water it may be allowed to stand for from 3 to 72 hours for somewhat enhancing the yield. In any case the reaction mass in combination with the water may be immediately neutralized by the addition of aqueous sodium hydroxide and then allowed to cool, preferably over night whereupon crystals precipitate out. The crystals may be separated from the liquid phase in any desired manner such as by filtration and then the raw crystals containing some impurities may be admixed with alcohol or a solution of equal volumes of alcohol and water. The mixture is brought to boiling so that solution of the crystals takes place and then the hot mixture is rapidly filtered. The filtrate is cooled whereupon crystallization occurs. The crystals therein are subjected to 4 or 5 more further recrystallizations in the manner hereinbefore set forth whereupon there is obtained a substantially chemically pure product composed of carbon, hydrogen, nitrogen and oxygen. The acetone-urea reaction product contains substantially 55% by weight of carbon and substantially 23% by weight of nitrogen and has the following empirical formula: $C_{11}N_4H_{20}O_2$ and in its purified state normally is a white crystalline material which is soluble in hot water, soluble in hot alcohol and in hot alcohol-water and has a melting point approximately 252° C. This compound has the following structural Formula I:

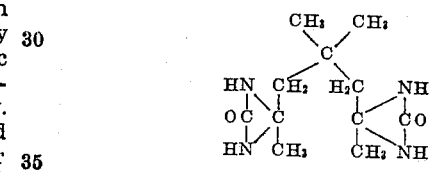

The urea-mesityl oxide and urea-diacetone alcohol reaction products are also composed of carbon, hydrogen, nitrogen and oxygen, each containing substantially 60% by weight of carbon and 20% by weight of nitrogen and have the following empirical formula: $C_7N_2H_{12}O$ and in their purified state normally are white crystalline solids soluble in hot water, soluble in hot alcohol and soluble in hot alcohol-water and soluble in hot toluene-alcohol 1–1. The crystals made with diacetone alcohol are what I term mono diacetone alcohol mono urea and have a melting point of approximately 279–280° C. while those made with mesityl oxide are what I term mono mesityl oxide mono urea and have a melting point of approximately 290–291° C. These compounds have the following structure Formula II or are isomers thereof

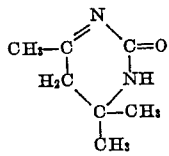

All these purified products as well as those before neutralization and/or purification besides being useful for the purpose intended herein may be hydrogenated to saturate only one or more of the double bonds. The carbonyl group (C=O) may be converted by hydrogenation to (COH) which, if desired, may have the hydroxyl group thereof converted to $NH_2$. In addition the double bond of the N present in the urea-mesityl oxide or urea-diacetone alcohol reaction products may also, if desired, be changed by hydrogenation. They may also be oxidized to produce substituted amino acids. They may also be treated to convert one or more of the trivalent nitrogens therein to the pentavalent state. They may also be halogenated for example to form dibromine products.

The following are examples given merely for the purpose of illustrating the reaction products and methods of producing the reaction products employed in this invention without in any way limiting the invention, all parts being given by weight unless otherwise specified.

Example 1

Although the molecular ratio of reactants may be varied, I prefer to employ them in approximately molecular proportions. 240 grams of urea and 540 grams of diacetone alcohol were placed in a glass reacting vessel. Then over a period of approximately 30 minutes, while the mass was being constantly stirred, there was slowly and uniformly bubbled therein about 56 grams of dry hydrochloric acid while the temperature of the mass, with the aid of external cooling as required, was maintained at approximately 40° C. throughout substantially the entire addition. During that period solution and reaction took place. After the termination of the hydrochloric acid addition, the mass was still maintained in the state of agitation by stirring and at a temperature no greater than 40° C. for approximately an additional 15 minutes. Then with the cooling medium completely removed the mass was allowed to stand for a period of 3 to 72 hours. At the end of that period of standing the mass was poured into an approximately equal volume of water and then there was added thereto a quantity of a solution of aqueous sodium hydroxide to render it substantially neutral and at this stage considerable crystallization occurred. The neutralized mass was allowed to stand for cooling for a period of about 16 hours and then the crystals were separated from the liquid phase by filtration or any other convenient method. The raw crystals were then dissolved in a hot 1–1 alcohol-water solution and the temperature of the mass was elevated to about boiling and at this temperature was filtered. The filtrate was allowed to cool whereupon crystallization takes place. The crystals were separated from the liquid phase and were again treated in the manner before set forth for recrystallization. This recrystallization procedure was carried out 3–6 more times to provide 350 grams of substantially chemically pure crystalline product known as Product A having a melting point of approximately 279–280° C. and shows decomposition at or about said melting point, and having the second empirical formula and structural formula II hereinbefore set forth.

Example 2

Employing the same procedure as that set forth in Example 1 and employing 540 grams of mesityl oxide in place of the diacetone alcohol, there is obtained a novel compound having the second empirical formula before set forth and either having the structural Formula II or being an isomer thereof. When mesityl oxide is employed the reaction proceeds considerably faster than with the diacetone alcohol and considerably greater care must be exercised in maintaining the temperature of the mass during the reaction at the preferred 35–40° C. level. In this case it is not as necessary, although advisable for maximum yields, to allow the mass to stand after the exothermic reaction has subsided for high yields and therefore at the termination of that reaction the mass may be poured directly into the cold water and the neutralization, crystallization and recrystallization as set forth in Example 1 are carried out and there is obtained more than 250 grams of substantially chemically pure, crystalline product known as Product B having a melting point of approximately 290–291° C.

Example 3

Employing the same procedure as that set forth in Example 1 and employing 360 grams of acetone in place of the diacetone alcohol there is obtained a reaction product having the empirical formula first set forth and having the structural formula I. In this case it is not necessary to employ the hot alcohol-water in the recrystallization procedure. Hot water alone may be used because of the solubility of said reaction product in that medium. By following that procedure there is obtained a quantity of substantially chemically pure crystalline product known as Product C and having a melting point of approximately 252° C.

Example 4

An alternate method for producing the compounds product A, product B and product C of Examples 1, 2 and 3 is to place 1¾ moles of concentrated sulfuric acid in a glass lined reacting vessel. Then, while being constantly stirred, there is added thereto slowly and while being externally cooled, 1 mole proportion of powdered urea. The vessel is being constantly cooled during the addition to maintain the temperature of the mass at a value of no higher than 40° C. and between about 35–40° C. After all of the urea has been added to the sulfuric acid, to this mass there is slowly added 1½ mole proportion of diacetone alcohol, mesityl oxide or acetone while the mass is being constantly stirred and maintained at a temperature between 35–40° C. Then the mass is allowed to stand for at least 24 hours and is subsequently diluted with two volumes of water and neutralized with an aqueous solution of sodium hydroxide. The neutralized mass is allowed to stand for cooling and crystallization for a period of about 16 hours. The crystalline precipitate may be purified in the same manner as that described in Examples 1, 2 and 3.

The carbon, hydrogen and nitrogen determinations on products A, B and C individually gave the following results which compare closely to their theoretical in the compounds whose structure and empirical formulas have hereinto-fore been set forth:

|  | Product A | | Product B | | Product C | |
|---|---|---|---|---|---|---|
|  | Theoretical | Average Found | Theoretical | Average Found | Theoretical | Average Found |
| Per Cent C | 60.0 | 59.99 | 60.0 | 59.90 | 55.0 | 54.70 |
| Per Cent H | 8.6 | 8.69 | 8.6 | 8.55 | 8.35 | 8.16 |
| Per Cent N | 20.0 | 20.05 | 20.0 | 19.43 | 23.3 | 23.12 |
| Per Cent O (by difference) | 11.4 | 11.29 | 11.4 | 12.12 | 13.35 | 14.02 |

While the methods for producing the novel reaction products have been described in detail, it is understood that various changes and modifications may be made, as for example, other acidic catalysts or other alkaline neutralizing agents may be employed without departing from the spirit of this invention to produce the novel reaction products being compounds of probable indicated formulae and probable indicated isomeric and structural characteristics.

In the course of experimentation with these various reaction products I have discovered that when fed to animals, examples of which are cattle, sheep, fur bearing animals such as fox, mink, skunk, etc. and also to poultry, it enhances certain of their qualities and characteristics. I believe that they behave in the nature of growth stimulants and appear to produce an effect in the nature of effects sometimes produced by hormones or pseudo-hormones. According to this invention, one or a combination of two or more of these reaction products are combined with an animal feed which, of course, may vary in its composition depending upon the particular class of animals to be fed. In most cases according to this invention the animal feed has added thereto a quantity of one or more of said reaction products in small amounts so that the resultant feed contains a minor proportion of said reaction products and not more than 25% and generally from 1% or less to 10% by weight of said reaction product depending upon the manner of feeding to be used.

A convenient method that I have employed in the practice of my invention is to disperse one of said reaction products A, B or C in purified and finely ground condition as an additive to the normal animal feeds employed either as a sole or part ration for the animals to be fed. The particular reaction product A, B or C, either alone or in combination with each other, may be dissolved in a small amount of hot alcohol and the resultant solution may be dispersed in any convenient manner in the feed and the feed dried to drive off the solvent. If desired, these compounds in the form of white crystalline solids may be mixed directly into the feed. Also, they may be dispersed in any of the edible oils such as cocoanut, olive, cottonseed or the like and the resultant mixture may be dispersed in the solid particles of the feed. Any of the commercial or "farm mixed" feeds may be employed as carriers of these compounds. The feeds to which such compounds are to be added generally stated contain a quantity of grains, sometimes in the ground form, meat or other protein substitute, minerals and vitamins sufficient to furnish an adequate diet to suit the requirements of the animals to be fed.

Having thus described my invention, what I claim is:

1. An animal feed including a minor proportion of a compound selected from the group consisting of (a) urea-diacetone alcohol organic reaction product which in substantially purified condition is normally a white crystalline solid having a melting point of approximately 279° C.–280° C., (b) urea-mesityl oxide organic reaction product which in substantially purified condition is normally a white crystalline solid having a melting point of approximately 290° C.–291° C., and (c) urea-acetone organic reaction product which in substantially purified condition is normally a white crystalline solid having a melting point of approximately 252° C.

2. An animal feed including a minor proportion of urea-diacetone alcohol organic reaction product which in substantially purified condition is normally a white crystalline solid having a melting point of approximately 279° C.–280° C.

3. An animal feed including a minor proportion of urea-mesityl oxide organic reaction product which in substantially purified condition is normally a white crystalline solid having a melting point of approximately 290–291° C.

4. An animal feed including a minor proportion of urea-acetone organic reaction product which in substantially purified condition is normally a white crystalline solid having a melting point of approximately 252° C.

MORTIMER T. HARVEY.

No references cited.